United States Patent
Lipton et al.

(10) Patent No.: US 7,583,437 B2
(45) Date of Patent: Sep. 1, 2009

(54) PROJECTION SCREEN WITH VIRTUAL COMPOUND CURVATURE

(75) Inventors: Lenny Lipton, Los Angeles, CA (US); Matt Cowan, Bloomingdale (CA)

(73) Assignee: Real D, Beverly Hills, CA (US)

( * ) Notice: Subject to any disclaimer, the term of this patent is extended or adjusted under 35 U.S.C. 154(b) by 541 days.

(21) Appl. No.: 11/297,932

(22) Filed: Dec. 8, 2005

(65) Prior Publication Data
US 2007/0133089 A1    Jun. 14, 2007

(51) Int. Cl.
*G03B 21/56* (2006.01)
*G03B 21/60* (2006.01)

(52) U.S. Cl. ............... 359/451; 359/456; 359/460; 359/743

(58) Field of Classification Search ........... 359/451, 359/459, 456, 455, 454, 743, 460
See application file for complete search history.

(56) References Cited

U.S. PATENT DOCUMENTS

| | | | | |
|---|---|---|---|---|
| 1,122,192 A | * | 12/1914 | Clark | ............ 359/459 |
| 1,279,262 A | | 9/1918 | Clark | |
| 1,535,985 A | * | 4/1925 | Clark | ............ 359/459 |
| 2,273,074 A | * | 2/1942 | Waller | ............ 359/451 |
| 3,408,132 A | | 10/1968 | Chandler et al. | |
| 3,637,285 A | | 1/1972 | Stewart | |
| 3,712,708 A | * | 1/1973 | Brown | ............ 359/459 |
| 4,068,922 A | * | 1/1978 | Dotsko | ............ 359/452 |
| 4,089,587 A | | 5/1978 | Schudel | |
| 4,191,454 A | | 3/1980 | Braatz et al. | |
| 4,473,355 A | * | 9/1984 | Pongratz | ............ 434/44 |
| 4,670,095 A | | 6/1987 | Negishi | |
| 4,911,529 A | | 3/1990 | Van De Ven | |
| 4,964,695 A | | 10/1990 | Bradley, Jr. | |
| 5,140,460 A | * | 8/1992 | Fukuhara et al. | ............ 359/445 |
| 5,337,179 A | | 8/1994 | Hodges | |
| 5,696,625 A | * | 12/1997 | Malifaud et al. | ............ 359/459 |
| 6,023,369 A | | 2/2000 | Goto | |
| 6,359,732 B1 | | 3/2002 | Yoshimura | |
| 6,600,600 B2 | * | 7/2003 | Chen | ............ 359/459 |
| 6,744,558 B2 | | 6/2004 | Tanaka et al. | |
| 6,865,023 B2 | * | 3/2005 | Shafer | ............ 359/445 |
| 6,898,008 B1 | | 5/2005 | Sun | |

OTHER PUBLICATIONS

Hines, Stephen P., "*Front-Projection Screens: Properties and Applications*," SMPTE Journal, Sep. 1986, pp. 903-911.
Shurcliff, W. A., "*Screens for 3-D and Their Effect on Polarization*," Journal of the SMPTE, vol. 62, Feb. 1954, pp. 125-133.

* cited by examiner

*Primary Examiner*—Christopher Mahoney
(74) *Attorney, Agent, or Firm*—Baker & McKenzie LLP

(57) ABSTRACT

A compound curved projection screen having a curvature about at least one region, such as a cylinder cross section curved about an axis or an ellipse about a plurality of axes, is provided. The compound curved screen comprises a plurality of angled planar reflective surfaces oriented to generally provide light energy in a direction of a screen centered axis. Compound curvature exists by the plurality of angled planar reflective surfaces being positioned in a generally curved and stepped manner about a second region different from the first region, such as a second axis orthogonal to the first axis.

19 Claims, 4 Drawing Sheets

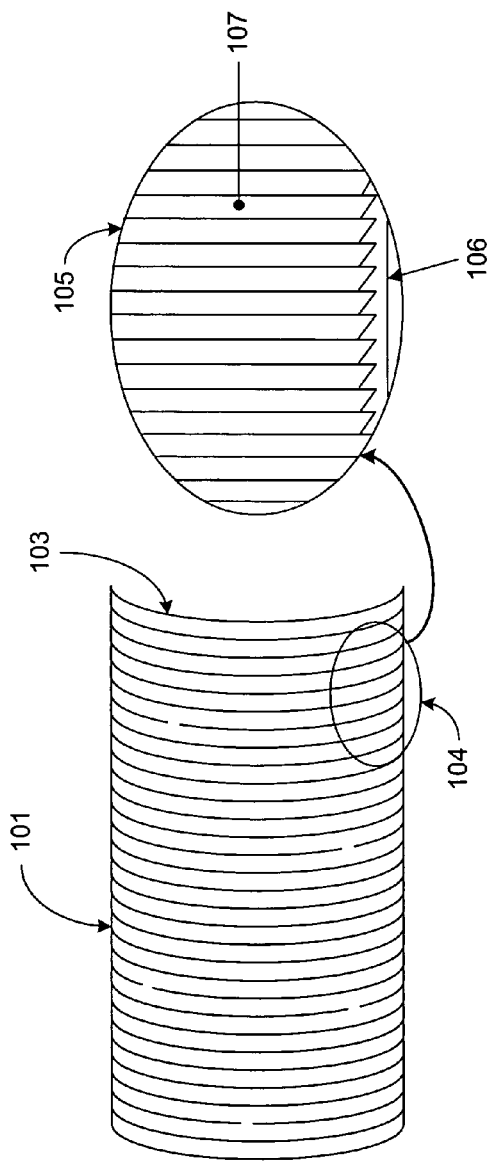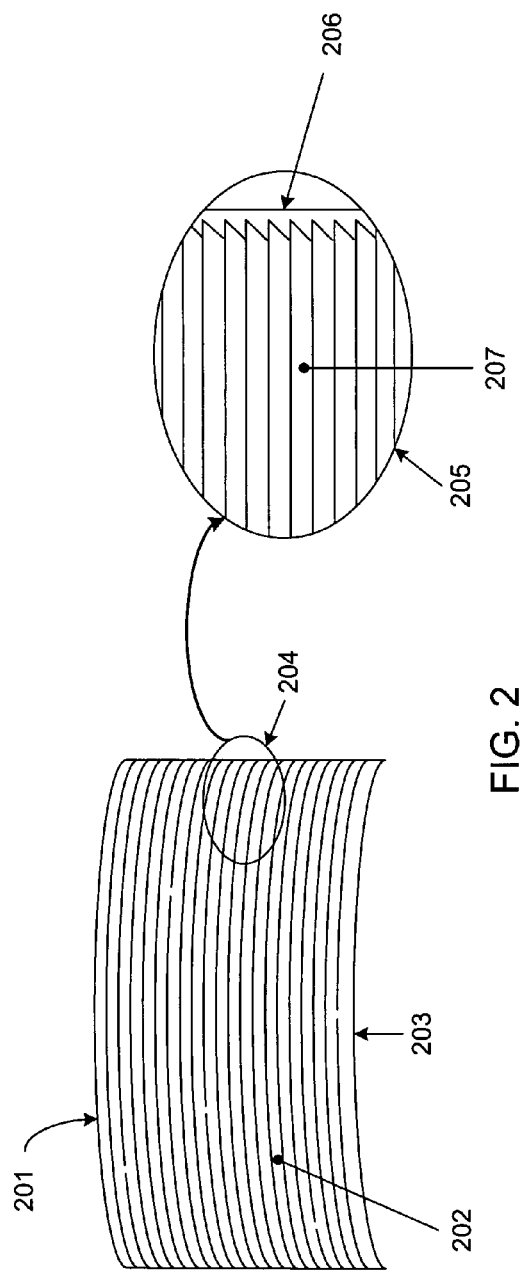

PROJECTION SCREEN WITH VIRTUAL COMPOUND CURVATURE

BACKGROUND OF THE INVENTION

1. Field of the Invention

This disclosure describes a novel motion picture projection screen with high gain and conservation of polarization for good 3D or stereoscopic viewing over a broad viewing angle. This front-projection screen works well with existing screen manufacturing techniques and methods for hanging screens in motion picture theaters.

2. Background of the Invention

The motion picture industry, like many industries, is tradition-bound and technical innovation tends to come from the outside. There are numerous examples of this, such as the introduction of sound, color, widescreen, and 3D. Any change to the existing motion picture infrastructure has to be carefully measured in terms of its economic benefits compared with established industry methods. For any innovation to prevail, the innovation should cooperate with the existing infrastructure by making relatively incremental changes to industry methods.

Certain established methods of manufacture of motion picture screens exist, and as important, specifications and methods exist that have to be followed in the motion picture theater in order to obtain the exhibitors' acceptance. Although there are good reasons for exhibitor acceptance of improved motion picture screens, ongoing concerns remain, such as the sound system's requirements, the ability to clean the screen, the cost of the screen, the means for hanging or installing the screen, and a host of other considerations, not the least of which is the image quality of the screen good for both two dimensional and three dimensional (2D and 3D) projection. The screen should have high contrast, an unobtrusive surface, and even illumination should be provided across the screen surface from any seat in the house.

Of particular concern in projecting stereoscopic motion pictures is the conservation of polarization. Screens that conserve polarized light must virtually always have a metallic surface, typically of painted on aluminum. The properties of that aluminum surface are to a large extent determined not only by the particulate size of the aluminum pigment, but also the binder used, and the method of application. Of particular concern is that the screen preserves the properties of polarized light for stereoscopic image selection. If depolarization occurs, the result will be crosstalk, wherein a portion of the unwanted perspective view is observed by each eye of a user. Crosstalk is undesirable, and detracts from the enjoyment of the stereoscopic movie by reducing the depth effect and causing viewer fatigue.

Motion picture screen performance for stereoscopic projection has been analyzed for decades. A lenticular or lenticulated screen generally must provide a good result in terms of having even illumination over a wide viewing angle while conserving polarization. The term "lenticulated," or "lenticular," implies that a refractive lens element is used. Specific to front-projection screen design, the term refers to rib-like structures that reflect, rather than refract, light.

Several previous designs for lenticules exist. Motion picture screens are invariably rectangular in shape. Certain designs have employed lenticules of stepped ridges with straight surfaces, or beads with a diffusing surface. Generally, previous developers have recognized the balance between specular, or highly reflective, and diffuse surfaces. A completely specular surface is a mirror, and a mirror has a very bright and small "hot spot," where a hot spot is the reflection from the reflective surface that provides a glare to a user Texturing of the aluminum screen surface can be added to make the screen semi-specular.

Other lenticular screen designs use different ribbed configurations where ribs, or lenticules, are employed, almost invariably running in the vertical direction, so that the projected light lost from extreme side angles of the screen can be deployed in the direction of the audience. In these designs the ribbed surface resembles that of a washboard or corduroy fabric. The location where the ribs intersect is a boundary line that can be called the "boundary axis" of the lenticular, or ribbed, or ridged, surface. Typically the boundary axis is oriented vertically, or parallel to the vertical edge of the screen in the case of a rectangular screen.

Certain screen designs employ a lenticular structure for increasing what is termed "screen gain." In many circumstances, some screen gain is desirable. Estimates are that only one third of the volume in space in front of a projection screen contains seating, meaning two-thirds of the projected light is wasted or unavailable for the aggregate eyes of the audience. Note that a motion picture screen cannot amplify light, but can only take the light projected onto the screen and reflect the light.

The more diffuse the surface of the screen, the more uniform is the intensity of reflected illumination as a function of angle. Such a screen is described as a screen with a matte surface, and a perfect matte screen for the purposes of this discussion can be described as one having a gain of 1.0. Such a screen has many advantages, not the least of which is that the screen provides even illumination to any seat in the house. In other words, even if an audience member is sitting far to the side, the brightness of the screen remains constant over the entire surface of the screen. A screen with a gain of 1.0 means that every audience member sees an image having the same brightness. However, a screen with a gain of 1.0 wastes a significant amount of light reflected to the ceiling, floor, and sides of the auditorium. A screen with a gain of 1 may be desirable, especially for a wide auditorium or one with a balcony or balconies, but for most current theater designs a significant amount of light energy is wasted.

Screen designers have attempted to overcome light losses by using so-called lenticular screens. The job of the lenticules or ribs is to present more surface area in a horizontal direction with a surface promoting reflecting properties in the horizontal. Light is gathered in the horizontal and reflected toward the seats in the audience where the light is needed. The side light which would be wasted is gathered and reflected to a more appropriate area of the theater, where people are seated. Such a screen is described as having "gain." Screen performance or gain can be measured with a photometer and compared with a matte screen, and a screen using such a lenticular design can exhibit decent gain. In general, screens having a gain much higher than 2.0 may result in hot-spotting. As noted, the ultimate hot spot results in a specular screen that is a mirror, exhibiting a very small hot spot.

Screens have been designed that are semi-specular in an attempt to reduce the hot spot. The ribs or lenticules act as a kind of virtual curvature because the ribs or lenticules are often used on flat screen surfaces. Hot-spotting can also be mitigated through screen cylindrical curvature, usually as a concave surface facing the audience.

One screen exhibiting strong gain, conservation of polarization, and spreading the light over well defined angle characteristics is the design used to produce the Kodak Ektalite screen of Chandler. The screen had an unintended benefit of having excellent polarization conservation characteristics. The Kodak Ektalite screen, now out of production, was a concave screen, the inside section of a sphere. The screen had the rectangular shape as required for motion picture and slide projection and was a rigid solid screen, having an aluminum foil coating applied to its concave surface. The aluminum foil coating had a bark-like texture, which served to soften the specular nature of the reflections. The screen had extremely high gain and a radius of curvature approximately 4.5 times the width of the front surface of the screen.

Two versions of such a screen have been described. One is built on a rigid surface of lathing, for example, covered with plaster, sanded smooth, and then sprayed with aluminum paint. The other is similar to a design known in the industry as a Torus screen, in which a membrane-like surface is coated with aluminum and hung on a frame concave in the vertical and horizontal directions. The screen is mounted on a boxlike structure with an exhaust fan that creates low pressure so that the screen will assume a surface that is the inside section of a sphere. Such a screen has excellent properties with regard to gain, and also for the conservation of polarized light if a proper aluminum surface is used. Although an ellipsoid has been recommended as the preferred section for the screen surface, the inside section of a sphere can approximate an ellipsoid. A screen whose vertical and horizontal sections are sections of a circle can provide similar benefits.

Problems exist with respect to the Kodak Ektalite type screen since a solid screen has to be built in place in the theater. Using a Kodak Ektalite type screen in a theater would significantly depart from exhibitors' current practices. Current screens are relatively easy to ship and assemble. They are rolled into a cylinder, like a rug, for shipment and assembled on a frame with cords attached to the frame pulling on the screen's grommets. The Chandler Kodak Ektalite design generally must be built in place, or assembled from sections, or some such technique that significantly departs from currently accepted theater screen implementation practice.

In addition, significant issues exist with a solid screen due to speaker placement issues. One of the important practices in the art of motion picture projection is to use a perforated screen, i.e. a screen with a regular pattern of small holes. Loudspeakers are placed behind the screen containing the perforations allowing sound to pass through the screen. This arrangement gives the audience the sensation that the sound is located in the same direction as the projected image. Theater owners have concerns over a non-perforated screen, as placement of speakers in other locations is perceived to compromise the audience perception of directionality of sound. Another problem with the Kodak Ektalite design concerns sound, but of a different nature. The concave shape of the screen and its smooth surface gives rise to audience members hearing the sound of conversations reflected from distant parts of the auditorium.

This approach to screen design, while having benefits, violates concerns described above: (1) such a screen on a theater scale involves an extraordinary screen manufacturing procedure, (2) with regard to the method of installation or hanging, such a screen is unlike other screens that are used in motion picture theaters, and (3) such a screen requires substantial changes in the deployment of theater loud speakers. Because exhibitors wish to have a proven product, such a radical design has led to limited acceptance of new screen designs.

In an attempt to overcome the difficulties with regard to a screen with a compound curvature surface, inventors have turned their attention to replicating this surface by means of special lenticules or ribs embossed or applied to the screen surface in order to provide the benefits that have been described above but without the necessity of actually having a screen with a compound surface. These designs include a Fresnel-like arrangement of ribbing that will appropriately direct light, as well as a screen material that can produce various surfaces and various types of lenticules. Another approach uses a similar Fresnel-like lens shape for reflection and which, in effect, can take the place of a compound screen. These are typically flat screens containing special ribbings or lenticules.

Unfortunately, these screens can be difficult to manufacture, and in terms of installation in a particular theater, each screen requires a unique optical design. Such a consideration would probably rule them out in terms of commercial deployment.

It would be desirable to offer a screen that overcomes certain screen design issues present in the prior designs.

SUMMARY OF THE INVENTION

According to one aspect of the present design, there is provided an apparatus comprising a plurality of lenticules or ribs forming a compound curved screen, the compound curved screen exhibiting a general overall curvature about a first axis. Each of the plurality of lenticules runs with the compound curved screen general overall curvature. Compound curvature for the apparatus exists via the plurality of lenticules being positioned in a generally curved and stepped manner about a second axis orthogonal to the first axis.

These and other advantages of the present invention will become apparent to those skilled in the art from the following detailed description of the invention and the accompanying drawings.

BRIEF DESCRIPTION OF THE DRAWINGS

FIG. 1 illustrates a projection screen whose surface is the inside section of a cylinder with a horizontal-going axis;

FIG. 2 illustrates a projection screen whose surface is the inside section of a cylinder with a vertical-going axis;

DETAILED DESCRIPTION OF THE INVENTION

Figure 3:
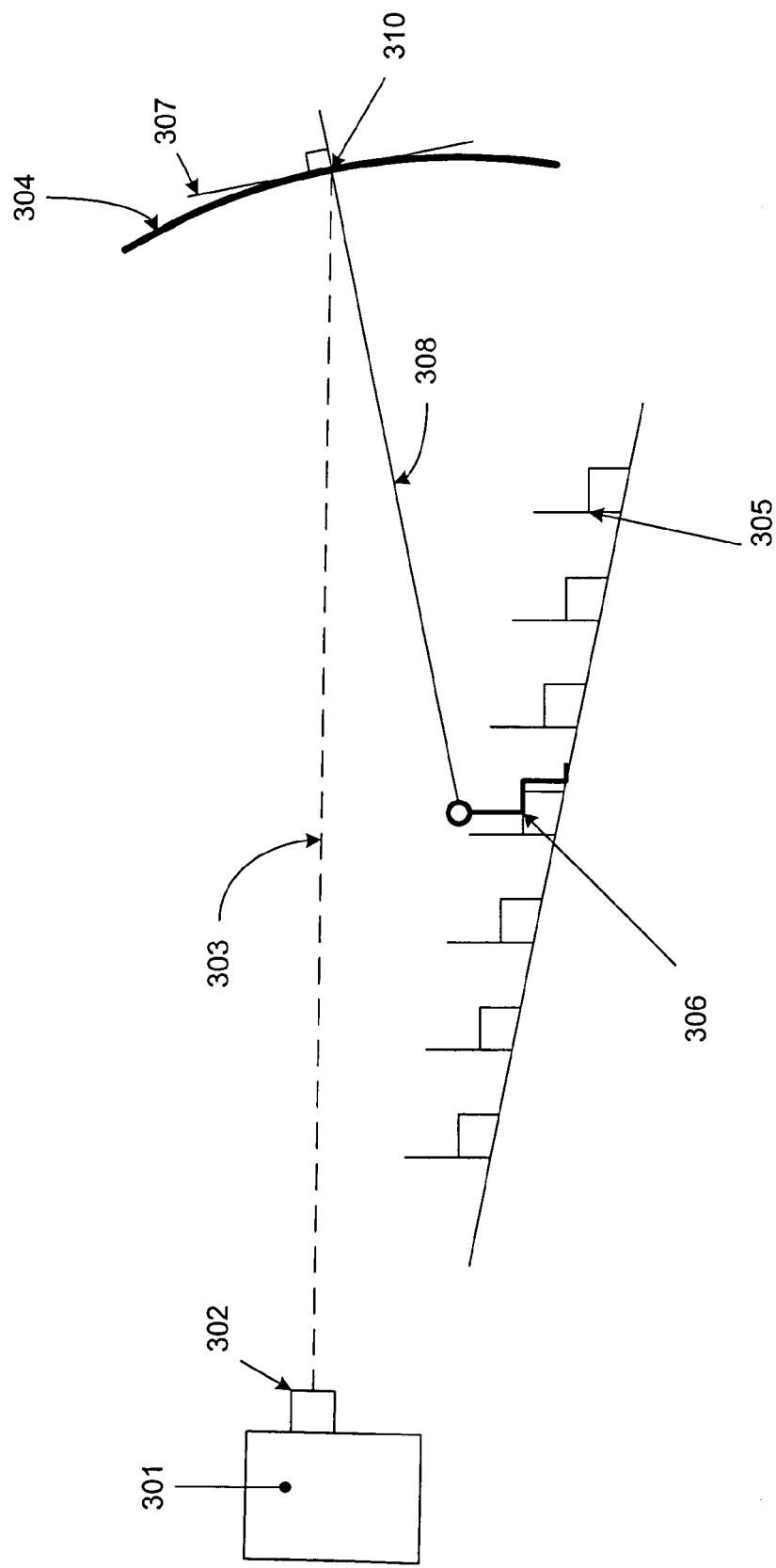
FIG. 3 is a diagrammatic view of a typical theater and projection setup using a screen of the type described in FIG. 1.

The present design is a screen effectively having a virtual compound curved surface that provides relatively high gain with a good angle of illumination, and also conserves polarization. The screen can be fabricated using existing manufacturing techniques and can be installed in theaters using existing framing methods. The present screen can be used to show stereoscopic and planar movies due to its desirable optical properties, easy manufacturability, and operating with existing equipment and requirements in theaters.

A compound curved screen with vertical and horizontal radii provides benefits in stereoscopic image projection and viewing over traditional flat or cylindrically curved screens. A stereoscopic movie theater screen may be comprised of a section of a sphere or possibly an ellipsoid. According to the present design, either a section of a sphere or an ellipsoid may be employed.

Motion picture screens typically found in today's theaters are grommetted sheets held taut on a frame. Such a construction generally precludes the use of a screen having a compound curvature. If the frame itself has a radius or curvature in both the vertical and horizontal, a screen stretched on such a surface will not assume a compound curve. Such a screen will exhibit a flattened depression or irregularity at its center. Most typical movie screens in theaters are hung on a flat frame or a frame with curved horizontal members. Hanging a screen on such a frame may be done for both matte and lenticular screens having a rib or lenticule boundary axis in the vertical. Screens are hung so that they form the inside section of a cylinder with a vertical-going axis, with the horizontal portions of the frame curved concavely with respect to the auditorium. Screens with an aluminized semi-specular surface usually have a gain of about 2.0.

For motion picture screens, the depth of curvature is only a few feet. Such a curvature on a screen being 30 to 50 feet across is generally sufficient to even out any hot spot that might result from a screen with a semi-specular surface. As noted, such screens generally have a surface that is not totally reflective but has some diffusion.

The present design is a screen having an overall curvature resembling a section of a cylinder with ribbing or stepped lenticules forming the screen surface, or a concave screen with steps or ribbing whose boundary axis is perpendicular to the curved edges of the screen. The concave curved edges may be vertical or horizontal. Two embodiments of the present design are shown in FIGS. 1 and 2.

The present design combines the idea of curving the screen and adding lenticules or ribs but, unlike other screens, the axis of the ribbing is orthogonal to, and not parallel to, the axis of the cylindrical surface of the screen. Using this orthogonal lenticule design with an aluminum coated semi-specular screen surface can reduce the hot spot. Such a screen is semi-specular and the cylindrical curvature of the screen combined with the design of the ribs or lenticules reduces the hot spot light in both directions. The ribbing or lenticules in such a design can reduce hot-spotting in a direction orthogonal to the axis of the ribbing or lenticules. The curvature of the screen tends to reduce hot spotting in the other direction.

FIG. 1 shows a screen 101 representing an inside cross section of a cylinder whose concave surface is facing toward the audience and the projector. The screen has lenticules or ribbing with vertical axes, i.e. vertical ribbing or lenticules. Curved edge 103 indicates that the curvature of the screen is in the vertical, and is the inside section of a cylinder whose axis is in the horizontal direction. Section 104 is a section of the screen, enlarged at point 105, showing a perspective view of screen 106 (corresponding to 101) and ribbing 107. The design of the fibbing is discussed with regard to FIGS. 4A and 4B, below. In summary, the ribbing is in the vertical direction and the axis of curvature of the screen ribs of FIG. 1 is in the horizontal direction and the angled steps or ribs provide a second axis of curvature in the vertical direction.

FIG. 2 shows a similar screen 201 whose curved edge 203 is the inside section of a cylinder around a vertical axis, the concavity of the screen facing the audience. The screen 201 also has a semi-specular coating similar to the screen of FIG. 1. The concavity of the screen spreads out the hot spot such that the hot spot is evenly distributed over the surface of the screen as viewed from any seat in the house. Edge 204 is enlarged in circle 205, showing ribbed or lenticular surfaces 206 for screen elements 202. The purpose of the lenticules 206 is to direct projected light, in this case from the vertical direction, toward the eyes of the seated audience rather than off in other directions. The light transmitted toward the audience in this embodiment would have otherwise been reflected from the surface of a non-ribbed screen to the ceiling or the floor of the auditorium. The reflect light in the direction of the seats. FIG. 2 shows a design usable in a theater because, at present, many screens are deployed with curvature about a vertical axis.

The present design is a screen curved in one direction but having a virtual curvature in the other, the virtual curvature made up of the lenticular or ribbed structure. The present design combines the actual curvature of the screen with the light-gathering properties of the lenticules to provide a screen having a relatively high gain and even coverage over a controlled spatial angle. The screen gain and concomitant controlled coverage using a screen as disclosed herein is directed in both the vertical and horizontal directions to points where the energy has a maximum effect.

Regarding construction of the screen, such a screen has an appropriate formulation of metallic paint, in all probability using aluminum as a major constituent. The screen has a generally a semi-specular surface providing for both good reflection and conservation of polarization.

Regarding the radius of curvature of the screen, some screens exhibit a radius of curvature approximately 4.5 times screen width, while other screens have a radius of curvature whereby the axis of curvature is somewhere between the center of the audience and the projection lens, while still other screens have a radius of curvature approximately 50 percent greater than the "throw," where throw is defined as the distance from the projection lens to the screen. The present design may be employed using any one of these curvature schemes, or another desirable curvature scheme, but the teaching here is generally independent of the radius of curvature.

The foregoing discusses the general radius of curvature consideration for the horizontal direction of the screen, but similar curvature radii for the vertical direction may also be presented. In general, the radius of vertical curvature is variable, and better results may be realized depending on the actual theater dimensions or other considerations. The axis of vertical curvature 308 as defined below may be below the horizontal, i.e. below the midline of the audience, or may be higher if balconies or higher seating is employed.

FIG. 3 illustrates a projector 301, projection lens 302, and lens axis 303. FIG. 3 further shows a theater having stadium seating 305 and a typical audience member 306. Screen 304 is shown for didactic purposes as a screen of the type of shown in FIGS. 1 and 2, where the diagram of FIG. 3 suffices to explain the strongly related principle of operation of the screen design shown in FIG. 2. FIG. 3 represents a cross section of a theater, with a vertical plane bisecting the theater, also bisecting the axis of the lens 303 and perpendicular to the horizontal. As noted the screen 304 is a screen of the type given by FIG. 1 for purposes of illustration, but a screen of the type of FIG. 2 could also be shown, in which case the view plane would be a horizontal.

FIG. 3 represents a visualized imaginary plane 307, tangential to the surface of the screen 304, touching the geometric center of the screen 310. Screen axis 308 is defined as the line perpendicular to the plane 307 at the geometric center of screen 304. The screen axis 308 of screen 304 is parallel with the lens axis 303 only in the unusual case where seating allows for such a geometry. In most theatrical applications, the lens axis is offset, or at an angle to the screen axis. The illustration of FIG. 3 shows a downward tilt to the screen so that the collected reflected light is aimed at the mid seats, exemplified by audience member 306. The screen axis 308 is adjusted or aimed to provide a "best" compromise location for reflecting the light energy to the auditorium.

Figure 4A:
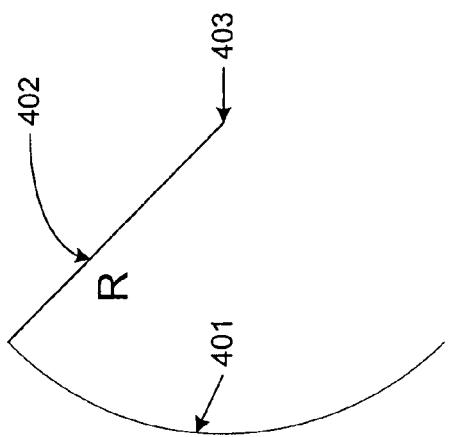
FIG. 4A illustrates the cross-section of a curved screen.
Figure 4B:
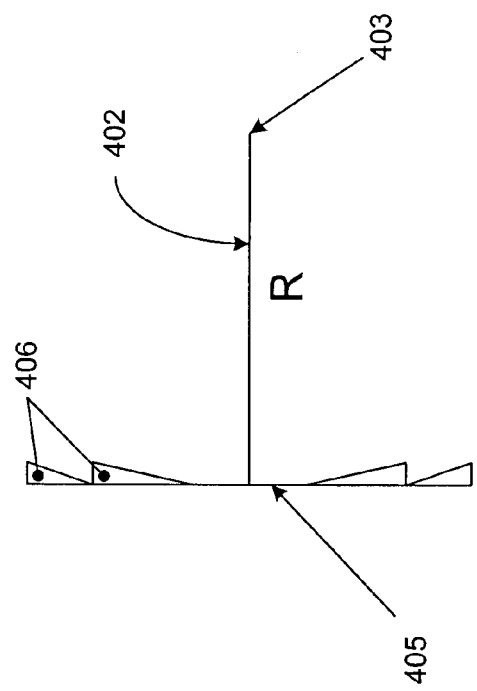
FIG. 4B illustrates the cross-section of a Fresnel-style following the curvature of FIG. 4A.
Figure 5:
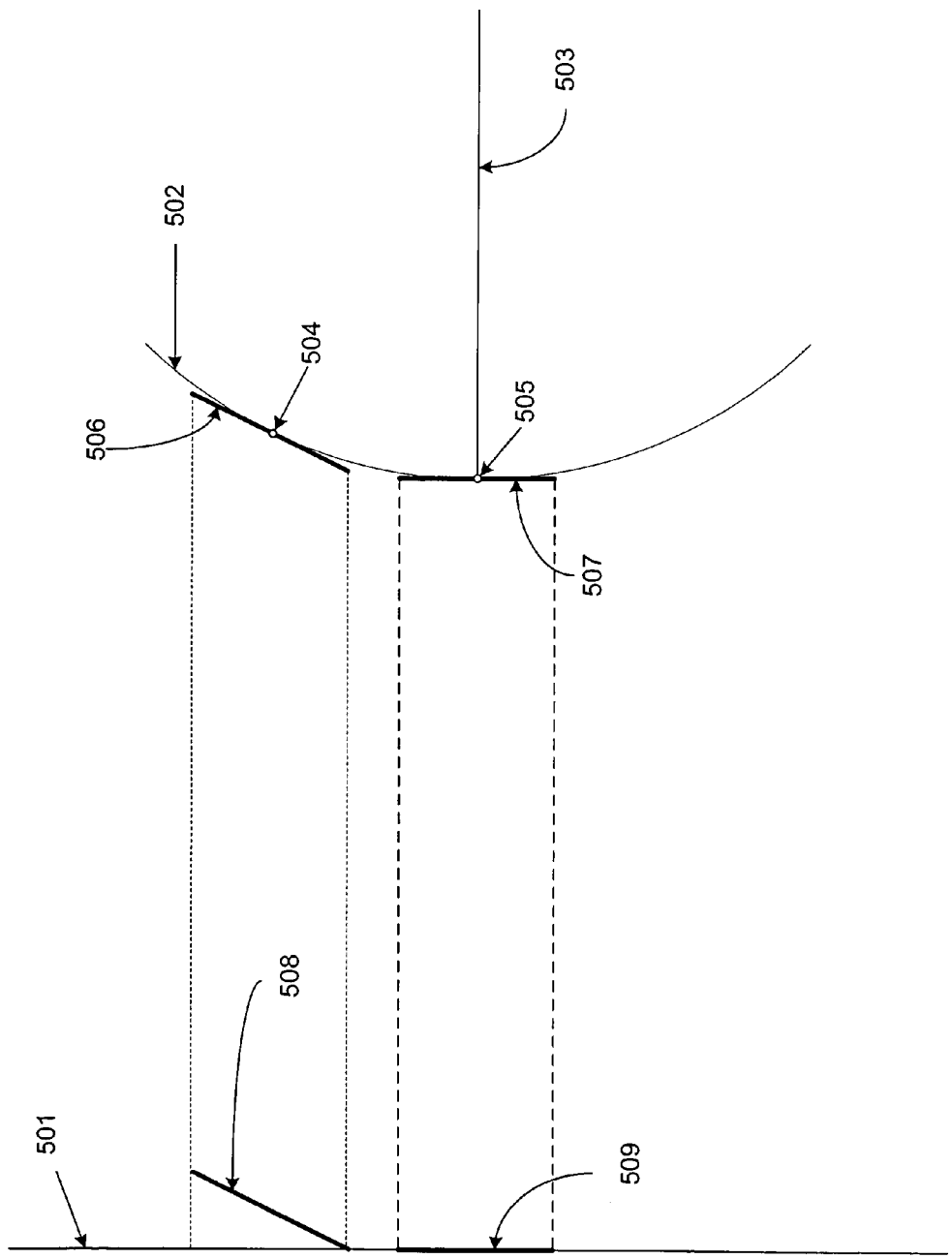
FIG. 5 illustrates the method for calculating and establishing the Fresnel surface.

FIGS. 4A, 4B, and 5 serve to explain the lenticular or ribbed design used in the present design. The ribbing follows the Fresnel-type structure of a "flattened" lens or, in this case, reflecting surface. For simplicity one drawing is illustrated for both types of screens, vertically ribbed and horizontally ribbed as shown in FIGS. 1 and 2, but in particular the discussion herein is focused on the geometry of FIG. 1. As may be appreciated by one skilled in the art, the principles illustrated herein for one type of screen suffices to explain how both work.

FIG. 4A shows concaved screen surface 401 with radius 402, the center of the screen surface, or central axis of curvature, located at point 403. The concave surface of the screen is semi-specular. Again, the particular screen geometry shown in FIG. 1 is illustrated with a concave surface being the inside section of a cylinder with a horizontal axis. Therefore curved section or concaved screen surface 401 is simply a cross section of screen 103. FIG. 4B follows the geometry of FIG. 4A with the center of the circle for screen radius 402 being at point 403. The view of FIG. 4B is coincident with a plane that passes through the cylindrical axis of the section of the screen and bisects the surface of the screen. Hence the view plane of FIG. 4B is orthogonal to the view plane of FIG. 4A. The screen 405 is made up of a series of ribs 406 collectively forming a single axis where the axis is perpendicular to the cylinder axis of curvature of the screen. The ribs 406 are made up of angled plane surfaces whose sizes in FIG. 4B are greatly exaggerated for illustrative purposes. Surface angles are spelled out in further detail in association with the discussion of FIG. 5. We note that the actual width of the ribs is generally adjusted to be unobtrusive to the front row of the audience.

Regarding construction of the individual ribs and ribbing, such a design may be fabricated in a variety of ways. One construction embodiment is provided herein, but the design is specifically not limited to a particular screen construction. The pattern of ribs or lenticules is formed, pressed, or embossed into the surface of the screen, where the screen is typically formed from a material such as vinyl. The surfaces of the ribs or lenticules so formed, pressed, or embossed are subsequently covered with a highly reflective coating, typically aluminum paint. The screen is generally perforated so that speakers can be positioned behind the screen and sound may be transmitted through the screen. The perforation process usually takes place before the sections of the screen are assembled. The screen may be formed of a unitary piece of screen material or smaller sections may be bonded together, typically as vertical segments. The ribbing is usually pressed into the sheet plastic material by means of calendaring or rolling screen material between dies. Typically the screen sections are bonded together and the screen are then hung and spray painted.

While metallic paint or painting has been discussed with this embodiment, other implementations may be employed, including but not limited to, for example, metalized surfaces may be employed that are not painted. For example, a screen constructed according to the present compound curved screen design could be formed by bonding a brushed aluminum foil in the rolling process to create the Fresnel reflective surfaces.

When hanging a PVC (polyvinyl chloride) screen on a curved frame, such as a cylindrical frame, the line formed down the center of the screen is curved in a convex direction with respect to the audience, or "away" from the audience. As a result, in practice, the screen hung on such a frame has a "wrong" direction of curvature. The direction of curvature may be corrected by changing the angle of the Fresnel surfaces across the screen. In practice, if a roller creates the surface, the pitch or angle of the ridges on the roller may be driven with cams, altering the nature of the lens while progressing across the screen.

FIG. 5 explains the optical principle employed in the screen 210 of FIG. 2. Referring to the illustrations of FIGS. 4A and 4B using the geometry of screen 210 of FIG. 2, FIG. 4A represents a top, rather than a side view, of the screen, and FIG. 4B is a side, rather than a top view of the edge of screen 202. FIG. 4B in this case represents a cross sectional slice through the vertical going direction of screen 201.

The following description of the Fresnel-ribbing is provided for screen 101, and generally applies to the design of either screen 101 or 201. With reference to FIG. 5, the curved surface operates as a Fresnel-stepped reflector surface. Screen 501 corresponds to screen 405 and has steps or ribs 508 and 509. These steps or ribs 508 and 509 are representative and generally correspond to steps or ribbing 406 in FIG. 4B. These steps or ribs 508 and 509 are associated with curved screen surface 502, which corresponds to screen surface 401 and has generally a radius R, shown by line 503 and line 403 in FIGS. 5 and 4B, respectively. Lines 506 and 507 are cross sections of imaginary planes perpendicular to the surface of the drawing that intersect the cylindrical surface 502 at points 506 and 507 respectively.

The planes, or visible straight line segments or projections onto the plane of the drawing surface are tangent to the circular segment 502 at points 504 and 505. These tangent plane surfaces are taken and projected onto screen surface 501 (see dotted lines) and form the Fresnel-steps. Segment 507 is essentially parallel to the screen surface 501 at segment 509 and therefore its step or Fresnel projection is coincident with the surface. Step or Fresnel projection 508 and plane tangent surface 506 are parallel, but since point 504 is located away from the center of the screen 502, step or Fresnel projection 508 is at angularly offset from screen substrate or surface 501. Similar projections may be realized for the lower half of the screen and for all intermediate locations on the surface of the circular screen representation 502 and the corresponding locations on the screen substrate.

The width of the ribbing or segments may be chosen to be invisible or generally unresolvable by the human eye from a closet viewing distance. In such a construction, thousands of ribs or steps may be provided across the screen surface. The function of these Fresnel-steps is to replicate an ideal curved surface necessary to create a virtual curvature for the screen in the desired direction.

In summary, FIG. 5 shows that if the screen is represented by curve 502, the construction of the screen comprises superimposing slanted ribs or lenticules, provided in FIG. 5 as segments 506 and 507, onto a flat surface represented by surface 501. In this Fresnel type arrangement, the straight surfaces such as surface 508 and 509 reflect light in an advantageous manner, i.e. toward the audience, with increased gain and better results.

The screen may therefore comprise a plurality of lenticules or ribs or angled planar reflective surfaces forming a compound curved screen, the compound curved screen exhibiting an overall curvature about a first axis. Each of the plurality of lenticules or ribs runs along the compound curved screen curvature. The lenticules or ribs are curved in a direction orthogonal to the first axis. One construction uses a curvature of a cylinder, establishing a single axis, but an ellipse defined by a plurality of axes, such as two, may also be employed to establish the overall curvature. In such a situation, the curvature about the first axis is a curvature about a composite axis representing an average or normalized value of the plurality of axes employed.

We have described a screen that has curvature in one direction and, by means of ribs or lenticules, virtual curvature in another direction. The present design is a screen with a cylindrical or circular section, but an ellipse can be used so long as the ellipse accomplishes the task of reflecting the light in the desired direction and increases screen gain. Since the angle of incidence of light is equal to the angle of reflection, curvature of the screen uses the light from the top and bottom or edges of the screen and reflects or directs that light toward the audience. The Fresnel-style ribbing is sufficiently fine such that the ribbing is generally difficult if not impossible to discern from the front row of the theater. The texture of the ribbed screen is generally invisible and serves to reflect the light in a direction orthogonal to the cumulative axis of reflection of the screen, or effectively directed by the curvature of the screen. Such a design creates a virtual compound curved screen, where the screen conforms to standard manufacturing techniques used by a number of entities associated with the motion picture industry. Screens according to the present design may be hung or installed more or less as screens are installed today. The existing theater's frame can be used in some applications.

The present screen design typically may cost little more to make than a conventional lenticular screen and little more to hang or mount in a theater, while exhibiting superior conservation of polarization and angle of view. Moreover, such a screen can be perforated so that speakers can be located in the conventional position behind the screen. Such a screen can approach the ideal characteristics of a compound curved screen, but maintains compatibility with existing manufacturing and exhibition infrastructure. Such a screen can have excellent characteristics for both stereoscopic and planar projection.

By the foregoing description, an improved projection system has been described. The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. An apparatus, comprising:
    a plurality of lenticules forming a compound curved screen, the compound curved screen exhibiting a general overall curvature about a single first axis, each of the plurality of lenticules running with the compound curved screen general overall curvature;
    wherein compound curvature exists via the plurality of lenticules comprising a series of sequentially changing stepped surfaces, the sequentially changing stepped surfaces each comprising a surface angled substantially perpendicular to a second axis orthogonal to the single first axis, each surface configured to receive light energy and reflect light energy substantially toward the second axis.

2. The apparatus of claim 1, wherein the lenticules are painted with a metallic paint.

3. The apparatus of claim 1, wherein the compound curved screen is perforated.

4. The apparatus of claim 1, wherein each lenticule comprises an angled surface curved in a direction having the second axis, where the second axis is orthogonal to the single first axis.

5. The apparatus of claim 4, wherein the angled surface is oriented to provide more reflected light toward a central screen axis.

6. The apparatus of claim 5, wherein the central screen axis substantially coincides with a desired position in a theater.

7. The apparatus of claim 1, wherein the compound curved screen operates as a Fresnel-stepped reflector surface.

8. The apparatus of claim 1, wherein the apparatus is configured to be hung on a traditional theater frame.

9. An apparatus comprising:
    a plurality of angled curved planar reflective surfaces forming a compound curved projection screen having a general single radius of curvature about a single first axis;
    wherein the angled curved planar reflective surfaces are positioned in a generally curved and changing stepped manner to reflect light substantially toward a second axis orthogonal to the single first axis to generally provide reflection of light energy in a direction of a collective axis, and wherein the sequentially angled curved planar surfaces each comprise a surface angled substantially perpendicular to the second axis.

10. The apparatus of claim 9, wherein the plurality of angled curved planar reflective surfaces are painted with a metallic paint.

11. The apparatus of claim 9, wherein the compound curved projection screen is perforated.

12. The apparatus of claim 9, wherein the collective axis substantially coincides with a desired position in a theater.

13. The apparatus of claim 9, wherein the compound curved projection screen operates as a Fresnel-stepped reflector surface.

14. The apparatus of claim 9, wherein the apparatus is configured to be hung on a traditional theater frame.

15. A compound curved projection screen having a general overall curvature about a single linear region, comprising:
    a plurality of angled curved planar reflective surfaces running in a direction of the general overall curvature and oriented to substantially provide enhanced light energy in a direction of a screen centered axis;
    wherein compound curvature exists by the plurality of angled curved planar reflective surfaces being positioned in an angularly changing stepped manner about a second region different from the single linear region, wherein positioning in the angularly changing stepped manner results in each surface of the plurality of angled curved planar reflective surfaces is angled substantially perpendicular to the second region and configured to direct light energy toward the second region.

16. The apparatus of claim 15, wherein the plurality of angled curved planar reflective surfaces are painted with a metallic paint.

17. The apparatus of claim 15, wherein the screen centered axis substantially coincides with a desired position in a theater.

18. The apparatus of claim 15, wherein the compound curved projection screen operates as a Fresnel-stepped reflector surface.

19. The apparatus of claim 15, wherein the apparatus is configured to be hung on a traditional theater frame.

* * * * *